United States Patent
Lin et al.

(10) Patent No.: US 10,802,617 B2
(45) Date of Patent: Oct. 13, 2020

(54) STYLUS CONNECTORS

(71) Applicant: HEWLETT-PACKARD DEVELOPMENT COMPANY, L.P., Spring, TX (US)

(72) Inventors: Richard S Lin, Houston, TX (US); Derek Kanas, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,100

(22) PCT Filed: Sep. 29, 2017

(86) PCT No.: PCT/US2017/054513
§ 371 (c)(1),
(2) Date: Jul. 26, 2019

(87) PCT Pub. No.: WO2019/066940
PCT Pub. Date: Apr. 4, 2019

(65) Prior Publication Data
US 2020/0241660 A1 Jul. 30, 2020

(51) Int. Cl.
*G06F 3/0354* (2013.01)
*G06F 1/16* (2006.01)
*G06F 13/40* (2006.01)

(52) U.S. Cl.
CPC .......... *G06F 3/03545* (2013.01); *G06F 1/169* (2013.01); *G06F 13/4077* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 8,975,860 B2 | 3/2015 | Lee | |
| 9,025,318 B2 | 5/2015 | Ashcraft et al. | |
| 9,063,693 B2 | 6/2015 | Raken et al. | |
| 9,110,629 B2 | 8/2015 | Leung | |
| 9,459,710 B1 | 10/2016 | Brand et al. | |
| 9,606,680 B1* | 3/2017 | Sundara-Rajan | ... G06F 3/03545 |
| 2014/0029182 A1 | 1/2014 | Ashcraft et al. | |
| 2014/0029183 A1 | 1/2014 | Ashcraft et al. | |
| 2015/0378455 A1 | 12/2015 | Immel et al. | |
| 2017/0248999 A1* | 8/2017 | Ng | .......... G06F 1/3287 |
| 2018/0059817 A1* | 3/2018 | Pirie | ............ G06F 3/03545 |

FOREIGN PATENT DOCUMENTS

| | | |
|---|---|---|
| CN | 204143384 U | 2/2015 |
| JP | 2016157380 A | 9/2016 |
| KR | 100874360 B1 | 5/2008 |
| WO | WO-2016175766 A1 | 11/2016 |

OTHER PUBLICATIONS

Rubino, D, ; Surface Pro 5 may have a rechargeable surface pen that docks magnetically, Jan. 2016.

* cited by examiner

*Primary Examiner* — Aneeta Yodichkas
(74) *Attorney, Agent, or Firm* — Brooks, Cameron & Huebsch, PLLC

(57) ABSTRACT

A number of systems and devices for stylus connectors are described herein. In one example, a stylus connector can include a first end to couple the stylus connector to a universal serial bus (USB) of a computing device and a second end to electrically couple a stylus to the USB of the computing device and structurally couple the stylus to the stylus connector.

14 Claims, 4 Drawing Sheets

STYLUS CONNECTORS

BACKGROUND

A stylus can be a peripheral device utilized with a computing device to interact with a user interface surface of the computing device and/or applications of the computing device. For example, a stylus can be a pen or pencil shaped device that can be utilized to make selections on a touch screen displaying a graphical user interface. In some examples, the stylus can be utilized with the user interface surface in a similar manner to a pencil or pen being utilized with a sheet of paper. In some examples, the stylus can include a battery for performing additional functions. For example, the stylus can include a number of inputs that can perform additional functions such as instructing the computing device to take a screen shot or to display additional options corresponding to the stylus.

DETAILED DESCRIPTION

Figure 1:
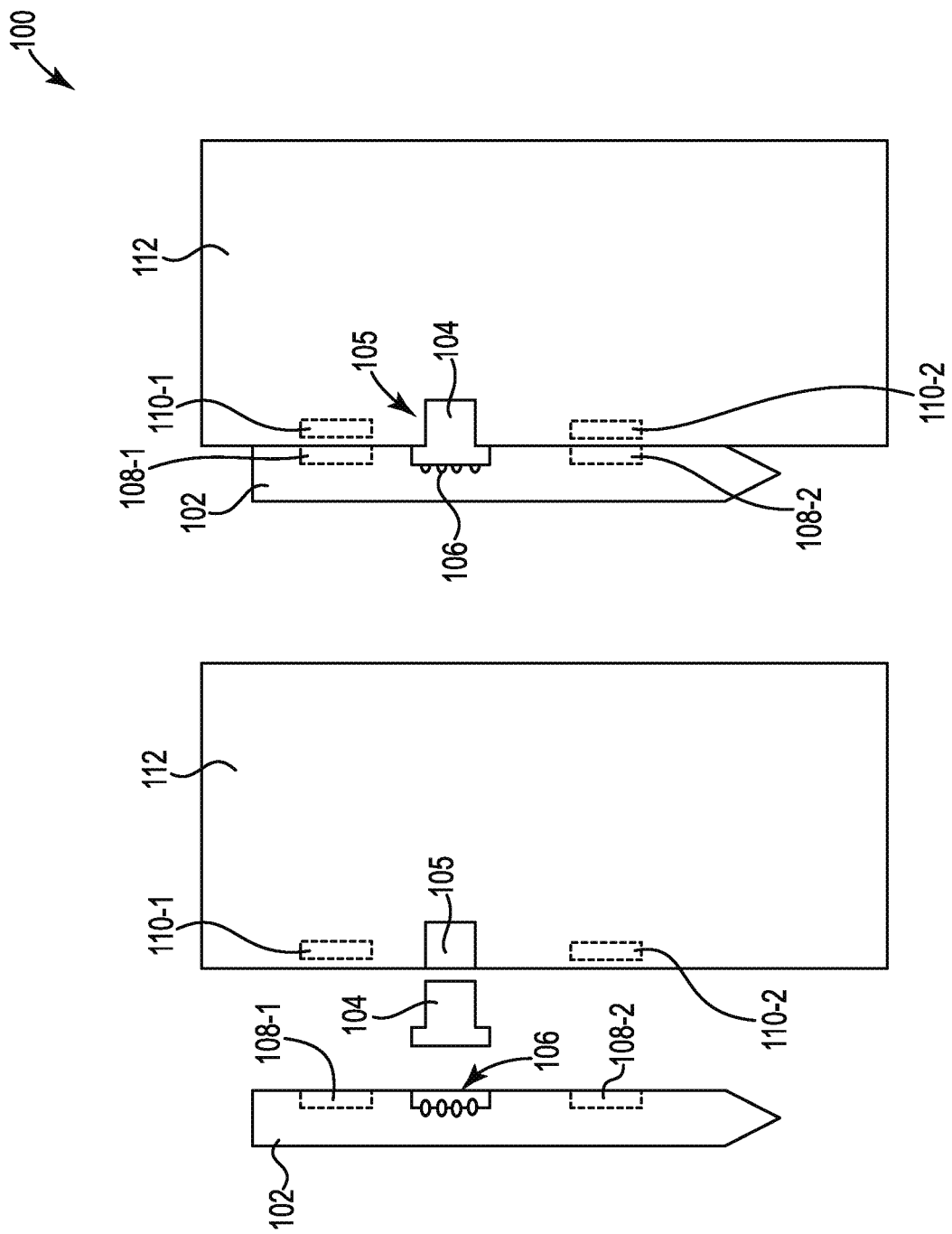
FIG. 1 illustrates an example system for a stylus connector consistent with the present disclosure.

A number of systems and devices for stylus connectors are described herein. In one example, a stylus connector can include a first end to couple the stylus connector to a universal serial bus (USB) of a computing device and a second end to electrically couple a stylus to the USB of the computing device and structurally couple the stylus to the stylus connector. In some examples, the stylus connectors described herein can be utilized to physically couple a stylus to a computing device and electrically charge the stylus. For example, the stylus connectors described herein can couple the stylus to the computing device to prevent the stylus from rotational movement and/or charge a battery of the stylus when coupled to the computing device.

In some examples, the number of systems and devices can include stylus that includes a plurality of spring loaded connectors or pogo connectors to electrically couple the stylus to a stylus connector, a recessed portion to receive a lip portion of the stylus connector, and a magnetic portion to align the plurality of pogo connectors and recessed portion of the stylus to the stylus connector. In some examples, the plurality of pogo connectors can be utilized to transfer electrical energy from a computing device to the stylus. In some examples, the lip portion of the stylus connector can be utilized to prevent the stylus from rotational movement by being positioned within a corresponding recessed portion of the stylus. As used herein, a spring loaded connector can be an electrical connector that includes a number of spring loaded pins that can be depressed by a corresponding electrical contact. In some examples, a spring loaded connector can be a pogo connector. As used herein, a pogo connector can be utilized to establish a temporary connection between two circuit boards. In some examples, the pogo connectors can include a cylinder with two sharp spring loaded pings that can be depressed to complete a circuit or electrical connection.

The stylus connectors described herein can be utilized to couple a stylus to a computing device and charge the stylus when the stylus is coupled to the computing device. The stylus connectors described herein can be removed from the computing device and removed from the stylus. That is, the stylus connectors described herein can be separate from the stylus and separate from the computing device. In this way, the stylus connectors can be utilized for a computing device when a stylus is utilized for the computing device and removed from the computing device when a stylus is not utilized for the computing device.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example system 100 for a stylus connector 104 consistent with the present disclosure. In some examples, the system 100 can include computing device 112, a stylus connector 104, and a stylus 102. In some examples, the stylus 102 can be peripheral device utilized with the computing device 112. For example, a stylus 102 can be utilized to make selections on a user interface of the computing device 112.

In some examples, the stylus 102 can include a battery that can be utilized to provide electrical energy to a Bluetooth transmitter, a Bluetooth receiver, and/or other type of electrical device. In some examples, the stylus 102 can be coupled to the computing device 112 with a stylus connector 104. The stylus 102 could then be stored while coupled to the computing device 112. In some examples, the stylus connector 104 can be a universal serial bus (USB) connector. For example, the stylus connector 104 can include a first end that can be coupled to a USB port 105 of the computing device 112 and a second end that can be coupled to a port 106 of the stylus 102. As used herein a USB connector can include USB-A, USB-C, DC, and/or other custom power connectors.

In this some examples, the USB port 105 of the computing device 112 can be utilized to electrically charge the battery of the stylus 102 when the stylus 102 is connected to the stylus connector 104 and the stylus connector 104 is connected to the USB port 105 of the computing device 112. That is, the computing device 112 can provide electrical energy to the stylus 102 via the stylus connector 104. In some examples, the pogo connectors of the recessed portion 106 of the stylus 102 can correspond to electrical contacts of the stylus connector 104 to transfer electrical energy from the computing device 112 to the stylus 102.

In some examples, the stylus 102 can include a recessed portion 106 with electrical connectors to receive the stylus connector 104. In some examples, electrical connectors can be spring loaded connectors or pogo connectors. For example, the stylus 102 can include a recessed portion 106 with pogo connectors to receive the stylus connector 104. In some examples, the recessed portion 106 can receive a lip portion of the stylus connector 104 to prevent the stylus 102 from rotational movement when the stylus 102 is coupled to the stylus connector 104. For example, a lip portion of the stylus connector 104 can be positioned within the recessed portion and prevent the stylus 102 from moving in a rotational direction that is into the page or out of the page as illustrated in FIG. 1. Preventing the rotational movement of the stylus 102 when coupled to the computing device 112 can maintain the position of the stylus 102.

In some examples, the stylus 102 can include a number of magnets 108-1, 108-2. The magnets 108-1, 108-2 can comprise a material that can generate a magnetic field. For example, the magnets 108-1, 108-2 can comprise an iron material or alloy material that includes component atoms that exhibit magnetic properties. In some examples, the number of magnets 108-1, 108-2 can be utilized to attract the stylus 102 to the computing device 112 when the computing device includes a number of corresponding magnets 110-1, 110-2. In some examples, a first magnet 108-1 can be positioned on a first side of the recessed portion 106 and a second magnet 108-2 can be positioned on a second side of the recessed portion 106.

In some examples, the number of magnets 108-1, 108-2 can be utilized to couple the stylus 102 to the computing device 112. For example, the computing device 112 can include a number of magnets 110-1, 110-2 that correspond to the number of magnets 108-1, 108-2 of the stylus 102. In some examples, the number of magnets 110-1, 110-2 can be positioned on each side of the USB port 105. For example, a first magnet 110-1 can be positioned on a first side of the USB port 105 and a second magnet 110-2 can be positioned on a second side of the USB port 105. In this way, a first magnet 108-1 of the stylus 102 can attract a first magnet 110-1 of the computing device 112 and a second magnet 108-2 of the stylus 102 can attract a second magnet 110-2 of the computing device 112.

In some examples, the stylus 102 can be physically and magnetically coupled to the computing device 112. For example, the stylus 102 can be magnetically coupled to the computing device 112 via a magnetic attraction between magnet 108-1 of the stylus 102 and magnet 110-1 of the computing device 112 and between magnet 108-2 of the stylus 102 and magnet 110-2 of the computing device 112. The magnetic coupling can prevent the stylus 102 from being remove laterally (e.g., from right to left as illustrated in FIG. 1, etc.) from the computing device 112.

In some examples, the physical coupling between the stylus 102 and the computing device 112 can be accomplished by a recessed portion 106 of the stylus 102 and a lip portion of the stylus connector 104. For example, the lip portion of the stylus connector 104 can be embedded within the recessed portion 106 of the stylus 102 to prevent rotational movement of the stylus 102. In this example, the lip portion of the stylus connector 104 can physically couple the stylus 102 to the computing device 112. Thus, in some examples, the number of magnets 108-1, 108-2 of the stylus 102 and the number of magnets 110-1, 110-2 of the computing device 112 can magnetically couple the stylus 102 to the computing device 112 while the lip portion of the stylus connector 104 and the recessed portion 106 of the stylus 102 can physically couple the stylus 102 to the computing device 112.

In some examples, the stylus connector 104 can be a separate device that can be removed from the computing device 112 and/or the stylus 102. In this way, the stylus connector 104 can be removed from the computing device 112 when the stylus 102 is not utilized. In addition, the stylus connector 104 can be removed from the stylus 102 when the stylus 102 is not being utilized with the computing device 112. Thus, the system 100 may not utilize additional hardware that is permanently attached to either the stylus 102 or the computing device 112.

In some examples, the stylus connector 104 can be utilized to align the magnet 108-1 from the stylus 102 with the magnet 110-1 from the computing device 112. In some examples, the stylus connector 104 can be utilized to align the magnet 108-2 from the stylus 102 with the magnet 110-2 from the computing device 112. For examples, the lip portion of the stylus connector 104 can align the stylus 102 with the computing device 112 such that the magnets 108-1, 108-2 of the stylus 102 are aligned with the magnets 110-1, 110-2 of the computing device 112. As described herein, the stylus connector 104 can also prevent the stylus 102 from rotational movement that can misalign the magnets 108-1, 108-2 of the stylus 102 and the magnets 110-1, 110-2 of the computing device 112. Thus, the stylus connector 104 can prevent rotational movement of the stylus 102 that could result in misaligned magnets 108-1, 108-2, 110-1, 110-2 and an unwanted removal of the stylus 102 from the computing device 112.

In some examples, the system 100 can be utilized to prevent lateral movement of the stylus 102 via the number of magnets 108-1, 108-2, 110-1, 110-2 and prevent rotational movement of the stylus 102 via the lip portion of the stylus connector 104 and the recessed portion 106 of the stylus 102. In this way, the system 100 can provide a more secure electrical connection between the stylus 102 and the computing device 112 compared to previous systems.

Figure 2:
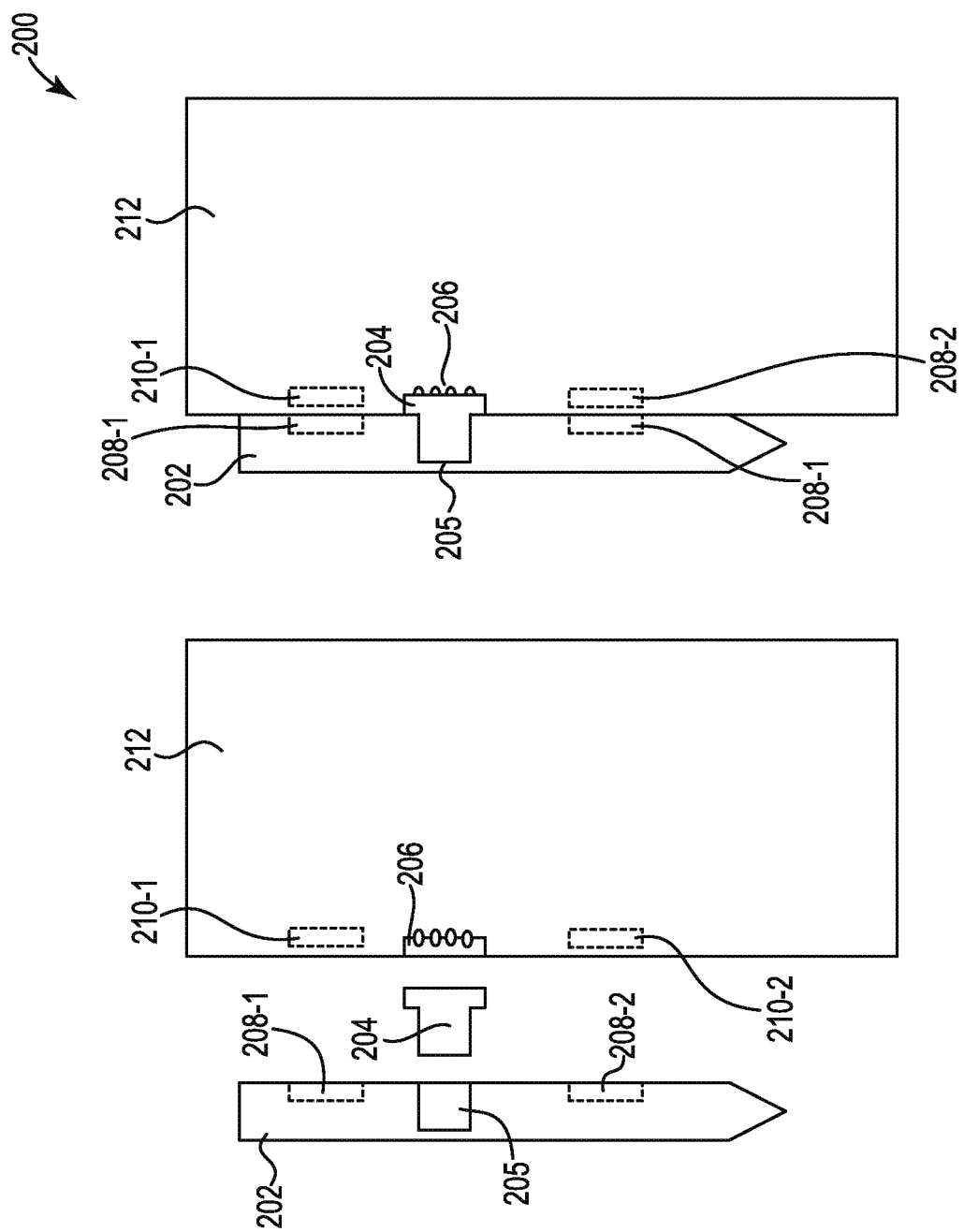
FIG. 2 illustrates an example system for a stylus connector consistent with the present disclosure.

FIG. 2 illustrates an example system 200 for a stylus connector 204 consistent with the present disclosure. In some examples, the system 200 can include computing device 212, a stylus connector 204, and a stylus 202. In some examples, the stylus 202 can be peripheral device utilized with the computing device 212. For example, a stylus 202 can be utilized to make selections on a user interface of the computing device 212.

In some examples, the stylus 202 can include a battery that can be utilized to provide electrical energy to a Bluetooth transmitter, a Bluetooth receiver, and/or other type of electrical device. In some examples, the stylus 202 can be coupled to the computing device 212 with a stylus connector 204. The stylus 202 could then be stored while coupled to the computing device 212. In some examples, the stylus connector 204 can be a universal serial bus (USB) connector. For example, the stylus connector 204 can include a first end that can be coupled to a USB port 205 of the stylus 202 and a second end that can be coupled to a port 206 of the computing device 212.

In this some examples, the USB port 205 of the stylus 202 can be utilized to electrically charge the battery of the stylus 202 when the stylus 202 is connected to the stylus connector 204 and the stylus connector 204 is connected to the recessed portion 206 of the computing device 212. That is, the computing device 212 can provide electrical energy to the stylus 202 via the stylus connector 204. In some examples, the pogo connectors of the recessed portion 206 of the computing device 212 can correspond to electrical contacts of the stylus connector 204 to transfer electrical energy from the computing device 212 to the stylus 202.

In some examples, the computing device 212 can include a recessed portion 206 with pogo connectors to receive the stylus connector 204. In some examples, the recessed portion 206 can receive a lip portion of the stylus connector 204 to prevent rotational movement when the stylus connector 204 is coupled to the computing device 212. For example, a lip portion of the stylus connector 204 can be positioned within the recessed portion 206 and prevent the stylus connector 204 from moving in a rotational direction that is into the page or out of the page as illustrated in FIG. 2. Preventing the rotational movement of the stylus connector 204 when coupled to the computing device 212 can maintain the position of the stylus 202 and/or maintain a position of a number of magnets 208-1, 208-2, 210-1, 210-2.

In some examples, the stylus 202 can include a number of magnets 208-1, 208-2. The magnets 208-1, 208-2 can comprise a material that can generate a magnetic field. For example, the magnets 208-1, 208-2 can comprise an iron material or alloy material that includes component atoms that exhibit magnetic properties. In some examples, the number of magnets 208-1, 208-2 can be utilized to attract the stylus 202 to the computing device 212 when the computing device 212 includes a number of corresponding magnets 210-1, 210-2. In some examples, a first magnet 208-1 can be positioned on a first side of the USB port 205 and a second magnet 208-2 can be positioned on a second side of the USB port 205.

In some examples, the number of magnets 208-1, 208-2 can be utilized to couple the stylus 202 to the computing device 212. For example, the computing device 212 can include a number of magnets 210-1, 210-2 that correspond to the number of magnets 208-1, 208-2 of the stylus 202. In some examples, the number of magnets 210-1, 210-2 can be positioned on each side of the recessed portion 206. For example, a first magnet 210-1 can be positioned on a first side of the recessed portion 206 and a second magnet 210-2 can be positioned on a second side of the recessed portion 206. In this way, a first magnet 208-1 of the stylus 202 can attract a first magnet 210-1 of the computing device 212 and a second magnet 208-2 of the stylus 202 can attract a second magnet 210-2 of the computing device 212.

In some examples, the stylus 202 can be physically and magnetically coupled to the computing device 212. For example, the stylus 202 can be magnetically coupled to the computing device 212 via a magnetic attraction between magnet 208-1 of the stylus 202 and magnet 210-1 of the computing device 212 and between magnet 208-2 of the stylus 202 and magnet 210-2 of the computing device 212. The magnetic coupling can prevent the stylus 202 from being remove laterally (e.g., from right to left as illustrated in FIG. 2, etc.) from the computing device 212.

In some examples, the physical coupling between the stylus 202 and the computing device 212 can be accomplished by a recessed portion 206 of the computing device 212 and a lip portion of the stylus connector 204. For example, the lip portion of the stylus connector 204 can be embedded within the recessed portion 206 of the computing device to prevent rotational movement. In this example, the lip portion of the stylus connector 204 can physically couple the stylus 202 to the computing device 212. Thus, in some examples, the number of magnets 208-1, 208-2 of the stylus 202 and the number of magnets 210-1, 210-2 of the computing device 212 can magnetically couple the stylus 202 to the computing device 212 while the lip portion of the stylus connector 204 and the recessed portion 206 of the computing device 212 can physically couple the stylus 202 to the computing device 212.

In some examples, the stylus connector 204 can be a separate device that can be removed from the computing device 212 and/or the stylus 202. In this way, the stylus connector 204 can be removed from the computing device 212 when the stylus 202 is not utilized. In addition, the stylus connector 204 can be removed from the stylus 202 when the stylus 202 is not being utilized with the computing device 212. Thus, the system 200 may not utilize additional hardware that is permanently attached to either the stylus 202 or the computing device 212.

In some examples, the stylus connector 204 can be utilized to align the magnet 208-1 from the stylus 202 with the magnet 210-1 from the computing device 212. In some examples, the stylus connector 204 can be utilized to align the magnet 208-2 from the stylus 202 with the magnet 210-2 from the computing device 212. For examples, the lip portion of the stylus connector 204 can align the stylus 202 with the computing device 212 such that the magnets 208-1, 208-2 of the stylus 202 are aligned with the magnets 210-1, 210-2 of the computing device 212. As described herein, the stylus connector 204 can also prevent the stylus 202 from rotational movement that can misalign the magnets 208-1, 208-2 of the stylus 202 and the magnets 210-1, 210-2 of the computing device 212. Thus, the stylus connector 204 can prevent rotational movement of the stylus 202 that could result in misaligned magnets 208-1, 208-2, 210-1, 210-2 and an unwanted removal of the stylus 202 from the computing device 212.

In some examples, the system 200 can be utilized to prevent lateral movement of the stylus 202 via the number of magnets 208-1, 208-2, 210-1, 210-2 and prevent rotational movement of the stylus 202 via the lip portion of the stylus connector 204 and the recessed portion 206 of the computing device 212. In this way, the system 200 can provide a more secure electrical connection between the stylus 202 and the computing device 212 compared to previous systems.

Figure 3:
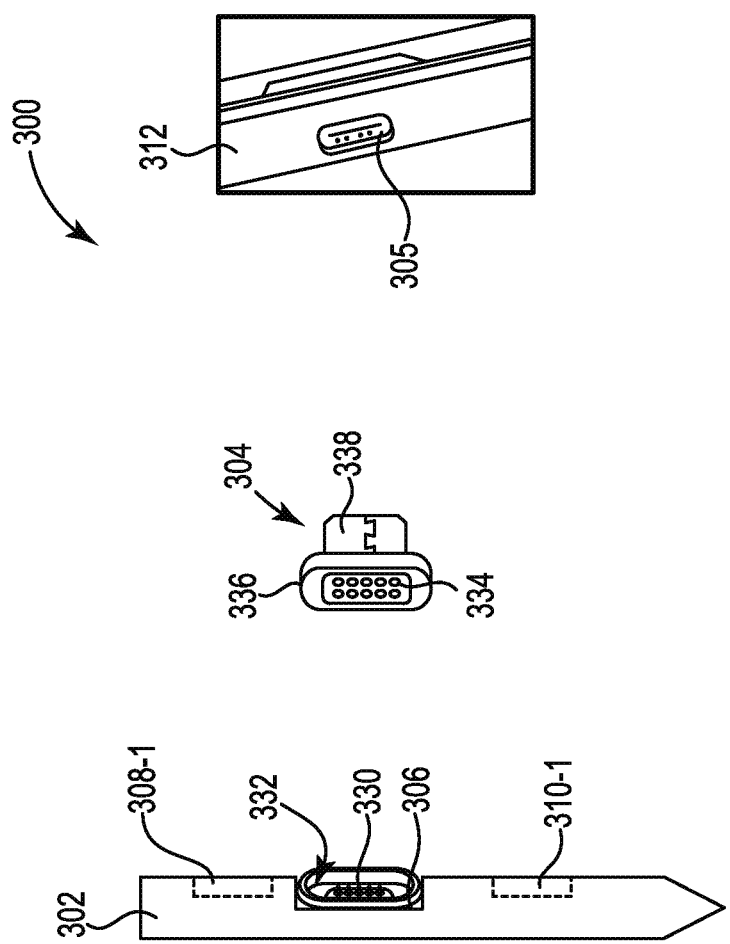
FIG. 3 illustrates an example system for a stylus connector consistent with the present disclosure.

FIG. 3 illustrates an example system 300 for a stylus connector 304 consistent with the present disclosure. In some examples, the system 300 can include the same or similar elements as system 100 as referenced in FIG. 1 and/or system 200 as referenced in FIG. 2. For example, the system 300 can include a computing device 312, a stylus connector 304, and a stylus 302. As described herein, a stylus 302 can be a peripheral device that can be utilized to provide inputs for the computing device 312. In some examples, the computing device 312 can be a tablet with a touch screen user interface that can receive inputs from the stylus 302.

In some examples, the computing device 312 can include a USB port 305 that can receive a first end 338 of the stylus connector 304. In some examples, the USB port 305 can be a USB-C female port. In some examples, the first end 338 of the stylus connector 304 can be a USB-C male port that can be inserted into the USB port 305. In some examples, the stylus connector 304 can include a first end 338 that can be coupled to the USB port 305 of the computing device 312 and a second end 336 that can include a lip portion and a number of electrical contacts 334. In some examples, the second end 336 can protrude from the computing device 312 when the first end 338 is coupled to the USB port 305 of the computing device 312.

In some examples, the second end 336 can include a number of electrical contacts 334 that can be utilized to transfer electrical energy from the USB port 305 of the computing device 312 to the pogo pins 330 of a recessed portion 306 of the stylus 302. For example, the electrical contact 334 can depress a pogo pin 330 such that electrical energy can be transferred across the electrical contact 334 to the pogo pin 330 when the first end 338 is coupled to the USB port 305 of the computing device 312.

In some examples, the recessed portion 306 can be indented into a side or edge of the stylus 302. For example, the recessed portion 306 can include a wall 332 that surrounds the pogo pins 330. In some examples, the wall 332 that surrounds the pogo pins 330 can protect the pogo pins 330 from physical damage when the stylus 302 is not coupled to the second end 336 of the stylus connector 304. In some examples, the wall 332 can correspond to the shape of the second end 336 of the stylus connector 304. For example, the wall 332 can be the same height as a lip portion of the second end 336 of the stylus connector 304 such that an edge of the stylus 302 is flush with an edge of the computing device 312 when the stylus 302 is coupled to the computing device 312 via the stylus connector 304.

As described herein, the lip of the second end 336 of the stylus connector 304 can be positioned within the recessed portion 306 and surrounded by the wall 332 to prevent rotational movement of the stylus 302 when the stylus 302 is coupled to the stylus connector 304. In some examples, the shape of the recessed portion 306 can correspond to the shape of the lip portion of the second end 336 of the stylus connector 304 such that the wall 332 can surround the lip portion of the second end 336 of the stylus connector 304 to prevent rotational movement of the stylus connector 304 when positioned within the recessed portion 306. As described herein, the stylus connector 304 can be utilized to align a number of magnets 308-1, 308-2 within the stylus 302 with a number of corresponding magnets (not shown) within the computing device 312. Thus, the stylus connector 304 can be utilized to align the magnets 308-1, 308-2 and prevent misalignment of the magnets 308-1, 308-2 by preventing rotational movement.

Figure 4:
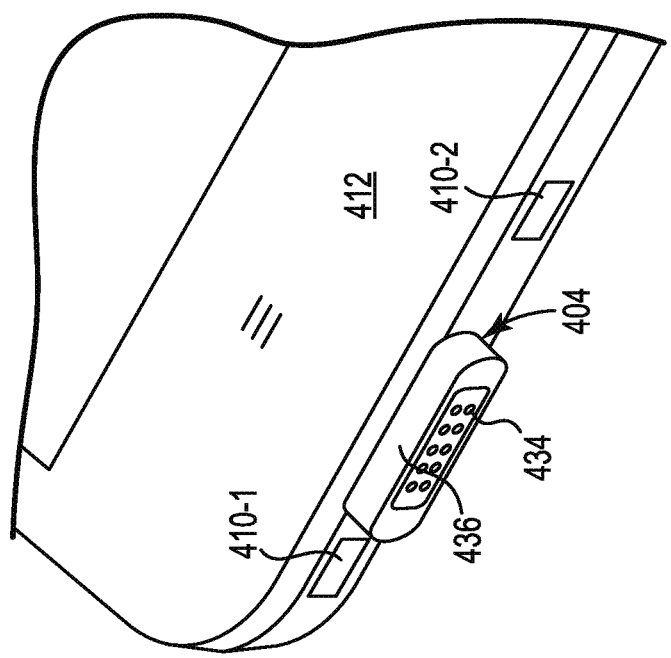
FIG. 4 illustrates an example of a stylus connector coupled to a computing device consistent with the present disclosure.

FIG. 4 illustrates an example of a stylus connector 404 coupled to a computing device consistent with the present disclosure. In some examples, the stylus connector 404 can be utilized to couple a stylus to the computing device 412 and/or charge the stylus via the computing device 412. As described herein, a stylus can be a peripheral device that can be utilized to provide inputs for the computing device 412. In some examples, the computing device 412 can be a tablet with a touch screen user interface that can receive inputs from a stylus.

In some examples, the computing device 412 can include a USB port that can receive a first end of the stylus connector 404. In some examples, the USB port can be a USB-C female port. In some examples, the first end of the stylus connector 404 can be a USB-C male port that can be inserted into the USB port. In some examples, the stylus connector 404 can include a first end that can be coupled to the USB port of the computing device 412 and a second end 436 that can include a lip portion and a number of electrical contacts 434. In some examples, the second end 436 can protrude from the computing device 412 when the first end is coupled to the USB port of the computing device 412. In some examples, the second end 436 can include a lip portion that is exposed from the computing device 412 when the stylus connector 404 is coupled to the computing device 412.

In some examples, the second end 436 can include a number of electrical contacts 434 that can be utilized to transfer electrical energy from the USB port of the computing device 412 to the pogo pins of a recessed portion of the stylus. For example, the electrical contact 434 can depress a pogo pin such that electrical energy can be transferred across the electrical contact 434 to the pogo pin when the first end is coupled to the USB port of the computing device 412.

In some examples, the recessed portion of the stylus can be indented into a side or edge of the stylus. In some examples, a wall of the stylus can correspond to the shape of the second end 436 of the stylus connector 404. For example, the wall can be the same height as a lip portion of the second end 436 of the stylus connector 404 such that an edge of the stylus 402 is flush with an edge of the computing device 412 when the stylus is coupled to the computing device 412 via the stylus connector 404.

As described herein, the lip of the second end 436 of the stylus connector 404 can be positioned within the recessed portion and surrounded by the wall of the recessed portion to prevent rotational movement of the stylus when the stylus is coupled to the stylus connector 404. In some examples, the shape of the recessed portion can correspond to the shape of the lip portion of the second end 436 of the stylus connector 404 such that the wall can surround the lip portion of the second end 436 of the stylus connector 404 to prevent rotational movement of the stylus connector 404 when positioned within the recessed portion of the stylus. As described herein, the stylus connector 404 can be utilized to align a number of magnets within the stylus with a number of corresponding magnets 410-1, 410-2 within the computing device 412. Thus, the stylus connector 404 can be utilized to align the magnets of the stylus with the magnets 410-1, 410-2 of the computing device 412 and prevent misalignment of the magnets 410-1, 410-2 by preventing rotational movement.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A stylus connector, comprising:
    a first end to couple the stylus connector to a universal serial bus (USB) of a computing device; and
    a second end to electrically couple a stylus to the USB of the computing device and structurally couple the stylus to the stylus connector with a lip portion of the stylus connector embedded within a recessed portion of the stylus.

2. The stylus connector of claim 1, wherein the first end comprises a USB-C male end when the USB of the computing device is a USB-C female end.

3. The stylus connector of claim 1, wherein the second end includes a plurality of pogo pins to electrically couple the stylus to the stylus connector.

4. The stylus connector of claim 1, wherein the second end allows the stylus to be structurally decoupled from the computing device in a single direction.

5. The stylus connector of claim 4, wherein the second end prevents the stylus from being structurally decoupled from other directions other than the single direction.

6. A stylus, comprising:
    a plurality of spring loaded connectors to electrically couple the stylus to a stylus connector;
    a recessed portion to receive a lip portion of the stylus connector such that the lip portion is embedded within the recessed portion to structurally couple the stylus to the stylus connector; and
    a magnetic portion to align the plurality of spring loaded connectors and recessed portion of the stylus to the stylus connector.

7. The stylus of claim 6, wherein the plurality of spring loaded connectors are within the recessed portion of the stylus.

8. The stylus of claim 6, wherein the plurality of spring loaded connectors receive an electrical charge from the stylus connector.

9. The stylus of claim 6, wherein the recessed portion prevents rotational movement when the lip portion of the stylus connector is received by the recessed portion of the stylus.

10. A system for a stylus connector comprising:
   a computing device that includes:
      a universal serial bus (USB) connector; and
      a first magnet positioned on a first side of the USB connector; and
      a second magnet positioned on a second side of the USB connector;
   a stylus connector that includes:
      a USB connector on a first end to couple the stylus connector to the USB connector of the computing device;
      a structural lip and a pogo connector on a second end to couple a stylus to the stylus connector; and
   a stylus that includes:
      a pogo connector positioned within a recess to receive the structural lip and the pogo connector on the second end of the stylus connector such that the structural lip is embedded within the recess to structurally couple the stylus to the stylus connector.

11. The system of claim 10, wherein the computing device provides electrical energy to the stylus via the stylus connector.

12. The system of claim 10, wherein the recess prevents the stylus from rotational movement when coupled to the stylus connector.

13. The system of claim 10, wherein the stylus connector is detachable from the computing device and the stylus.

14. The system of claim 10, wherein the stylus includes a third magnet to align with the first magnet of the computing device and a fourth magnet to align with the second magnet of the computing device.

* * * * *